(12) United States Patent
Martus

(10) Patent No.: US 7,347,454 B2
(45) Date of Patent: Mar. 25, 2008

(54) HOSE/CLAMP ASSEMBLY WITH REMOVABLE RETAINING DEVICE

(75) Inventor: Craig W. Martus, Marion County, FL (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 125 days.

(21) Appl. No.: 11/150,164

(22) Filed: Jun. 13, 2005

(65) Prior Publication Data

US 2008/0007043 A1 Jan. 10, 2008

(51) Int. Cl.
*F16L 55/00* (2006.01)
(52) U.S. Cl. .................. 285/23; 24/20 R; 29/890.14
(58) Field of Classification Search ................. 285/23; 248/62, 65, 73; 24/20 R; 29/890.14
See application file for complete search history.

(56) References Cited

U.S. PATENT DOCUMENTS

| 541,596 | A | 6/1895 | Curlett |
| 785,737 | A | 3/1905 | Jones |
| 2,846,016 | A | 8/1958 | Hanes |
| 3,365,218 | A | 1/1968 | Denyes |
| 3,389,442 | A | 6/1968 | Tetzlaff |
| 4,438,960 | A | 3/1984 | Carroll et al. |
| 4,453,289 | A | 6/1984 | Kleykamp et al. |
| 4,592,576 | A | 6/1986 | Proctor et al. |
| 4,763,695 | A | 8/1988 | Dooley |
| 4,763,932 | A | 8/1988 | Matz et al. |
| 4,773,129 | A | 9/1988 | Muhr |
| 5,002,094 | A | 3/1991 | Brovont |
| 5,145,218 | A | 9/1992 | Worley et al. |
| 5,185,913 | A | 2/1993 | Campo et al. |
| 5,234,233 | A | 8/1993 | Fix |
| 5,388,321 | A | 2/1995 | Farrell |
| 5,620,209 | A | * 4/1997 | Sauer ........................ 285/23 |
| 5,675,871 | A | * 10/1997 | Webb et al. ............... 24/20 R |
| 5,749,603 | A | * 5/1998 | Mann ......................... 285/23 |
| 5,820,166 | A | * 10/1998 | Webb ......................... 285/23 |
| 5,915,739 | A | * 6/1999 | Cradduck et al. .......... 285/114 |
| 6,343,772 | B1 | * 2/2002 | Oi .............................. 248/75 |
| 6,408,492 | B1 | * 6/2002 | Sparks et al. ................ 24/336 |
| 6,530,609 | B1 | 3/2003 | Chatterton |
| 6,701,581 | B2 | * 3/2004 | Senovich et al. .......... 24/20 R |
| 7,093,808 | B2 | * 8/2006 | Yuzuriha et al. ............. 248/62 |
| 2002/0060453 | A1 | 5/2002 | Spurgat |
| 2004/0056158 | A1 | * 3/2004 | Stuart et al. .............. 248/74.2 |

FOREIGN PATENT DOCUMENTS

| EP | 1 333 216 A1 | 6/2003 |
| WO | WO 02/42675 A2 | 5/2002 |

* cited by examiner

Primary Examiner—David Bochna
(74) Attorney, Agent, or Firm—Joseph V. Tassone; Thompson Hine LLP

(57) ABSTRACT

A hose/clamp assembly is provided that has a hose, a hose clamp, and a retaining device. The hose clamp is openable and closable. The retaining device has an arm, a clamp retainer attached to a first end of the arm, and a hose clip attached to a second end of the arm. The retaining device is removably attached to the hose and the hose clamp. The retaining device secures the hose clamp to the hose when the hose clamp is in a expanded, open configuration.

20 Claims, 4 Drawing Sheets

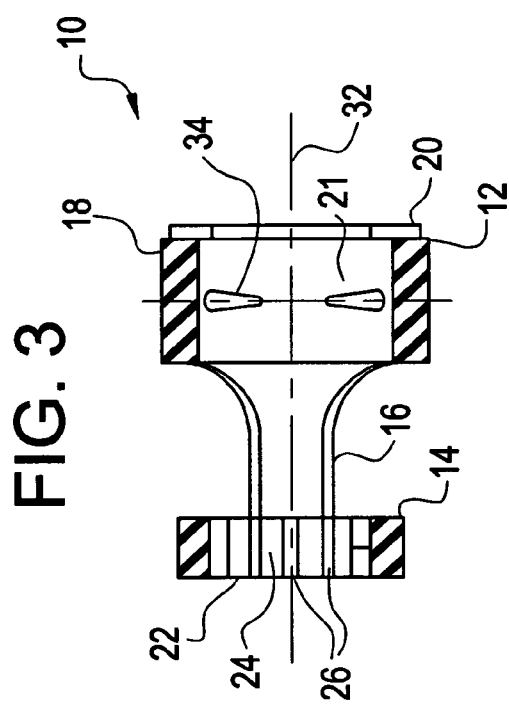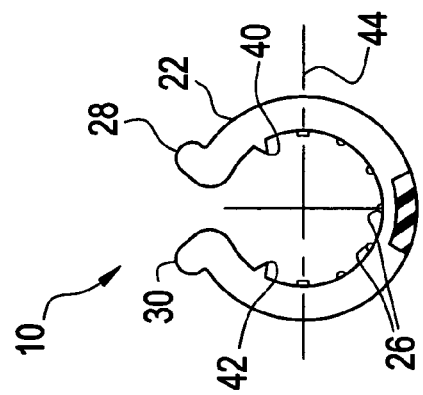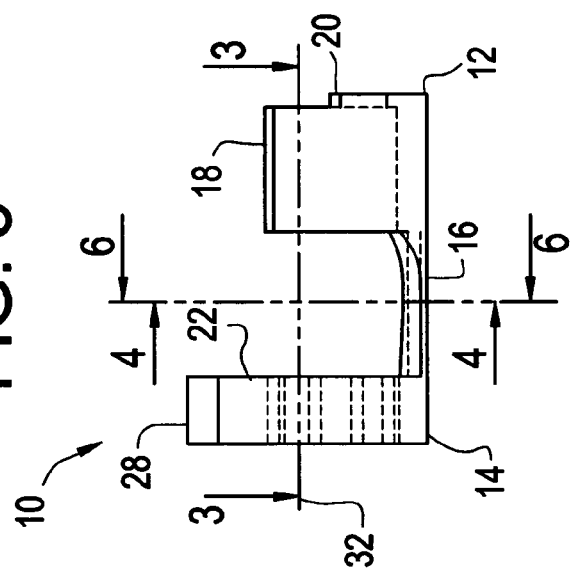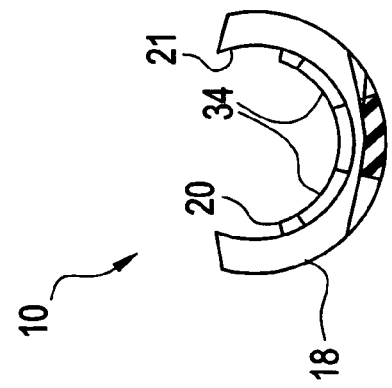

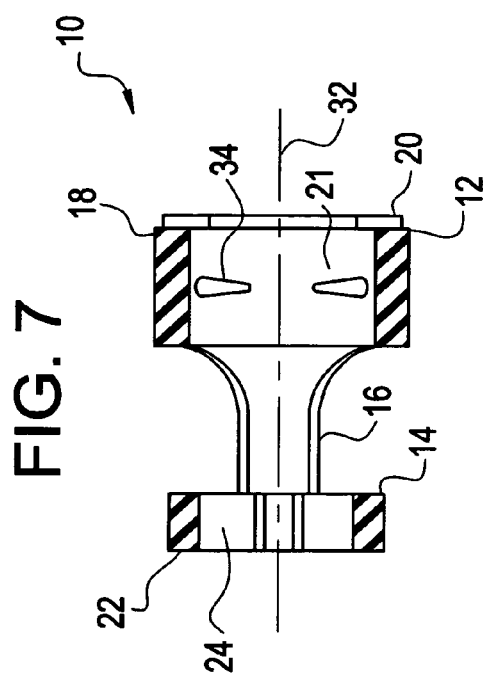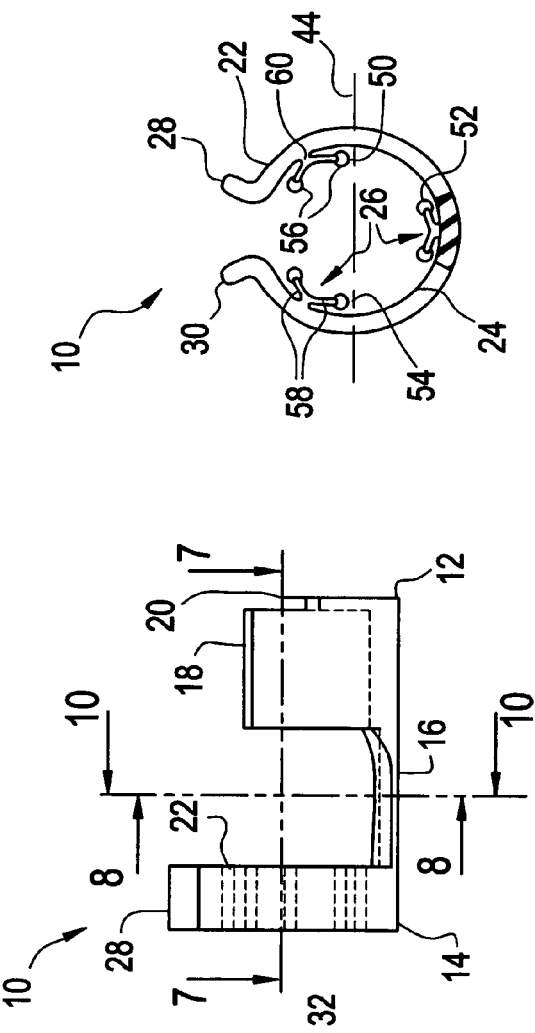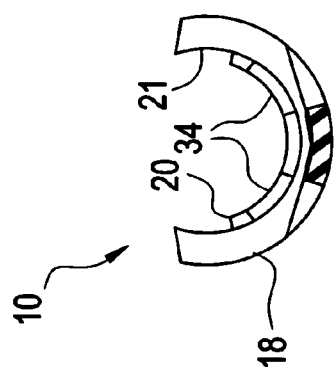

US 7,347,454 B2

HOSE/CLAMP ASSEMBLY WITH REMOVABLE RETAINING DEVICE

TECHNICAL FIELD

This invention relates to hose/clamp assemblies, and more particularly, to hose/clamp assemblies in which the clamp is in a expanded, open configuration.

BACKGROUND

Automobile manufacturers often require suppliers to provide parts that are partially assembled to facilitate final assembly of the parts in the vehicles. For this reason, suppliers sometimes preassemble a hose clamp on the end of each hose, while the hose clamp is in a expanded, open configuration. The hose/clamp assemblies may then be shipped to another manufacturing site for quick assembly onto the stem component of the fluid-carrying system of the vehicle.

Suppliers have used numerous devices and methods for holding the hose clamps on the hose, with varying degrees of success. For example, sometimes an adhesive such as cyanoacrylate is used to bond a small portion of the hose clamp to the hose. In this method, the hose must first be thoroughly cleaned, such as with an isopropanol solution, to remove dirt and residual lubricants, prior to applying the adhesive. Then special fixtures must be used to hold the clamp on the hose at a desired location and orientation until the adhesive cures adequately. These preassemblies may be shipped cross-country by truck during several days of hot weather. Under such conditions, the adhesive may disassociate from the hose, and the hose clamps may fall loose from the hoses, at significant cost to the supplier. Permanently bonding adhesives are available, but using them for a hose/clamp assembly may not facilitate easy disassembly of the hose from the stem component of the vehicle system, thus complicating future servicing of the system.

Using a clip or retaining device avoids the temperature issue, but such a device should not constrict the open end of the hose and require higher force than what is required to position only the hose onto the stem component.

What is needed, therefore, is an improved hose/clamp assembly that does not come apart when exposed to prolonged, high temperatures. Also what is needed is a hose/clamp assembly that may be easily disassembled to facilitate later servicing. Finally what is needed is a hose/clamp assembly that does not require additional force to position on the stem component of the vehicle system.

SUMMARY

A hose/clamp assembly comprises a hose, a hose clamp, and a retaining device. The hose clamp is openable and closable. The retaining device has an arm, clamp retainer attached to a first end of the arm, and a hose clip attached to a second end of the arm. The retaining device is removably attached to the hose and the hose clamp. The retaining device secures the hose clamp to the hose when the hose clamp is in a expanded, open configuration. The retaining device is also removable from the hose and the hose clamp when the hose clamp is in a contracted, closed configuration.

BRIEF DESCRIPTION OF THE DRAWINGS

These and other features, aspects, and advantages of the invention will become more readily apparent with reference to the following detailed description when read in conjunction with the accompanying drawings. The drawings referred to herein will be understood as not being drawn to scale, except if specifically noted, the emphasis instead being placed upon illustrating the principles of the invention. In the accompanying drawings:

FIG. 3 is a sectional view, taken at line 3-3 of FIG. 5, of a second embodiment of the retaining device;

FIG. 4 is a sectional view, taken at line 4-4 of FIG. 5, of the second embodiment of the retaining device;

FIG. 5 is a side view of the second embodiment of the retaining device;

FIG. 6 is a sectional view, taken at line 6-6 of FIG. 5, of the second embodiment of the retaining device;

FIG. 7 is a sectional view, taken at line 7-7 of FIG. 9, of a third embodiment of the retaining device;

FIG. 8 is a sectional view, taken at line 8-8 of FIG. 9, of the third embodiment of the retaining device;

FIG. 9 is a side view of the third embodiment of the retaining device; and

FIG. 10 is a sectional view, taken at line 10-10 of FIG. 9, of the third embodiment of the retaining device.

DETAILED DESCRIPTION

Figure 1:
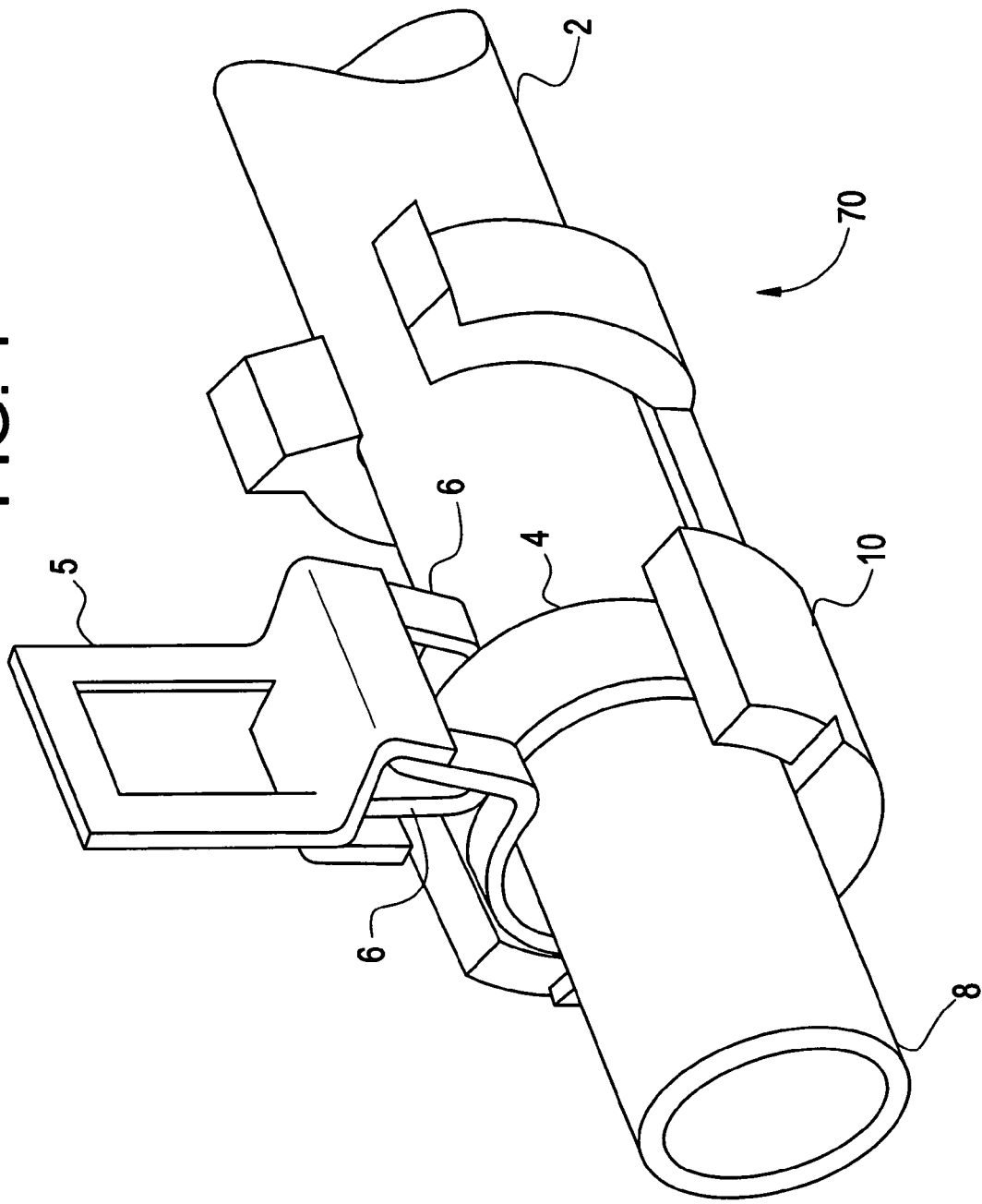
FIG. 1 is a perspective view of a hose/clamp assembly with a retaining device.

FIG. 1 is a perspective view of the present invention, a hose/clamp assembly 70 comprising a hose 2, a hose clamp 4, and a retaining device 10. Hose/clamp assembly 70 is suitable for numerous applications in which it is desired to preassemble hose clamp 4 onto hose 2 for a period of time prior to final assembly onto the stem component of a fluid-carrying system such as, for example, an automotive system. Hose/clamp assembly 70 is disclosed herein for use with an automotive, fluid-carrying system, such as a transmission cooler, although many other applications are possible with only minor variations to the features of hose/clamp assembly 70.

As illustrated in FIG. 1, hose 2 is made of a polymer such as ethylene acrylic, which is resistant to high temperature, chemical environments. Hose 2 has an outer diameter of 20 millimeters and an inner diameter of 12.5 millimeters, and has a material modulus of approximately 300 pounds/square inch at ten percent strain. Hose clamp 4 is positionable around hose 2 at a predetermined location and orientation, and is openable and closable. In FIG. 1, hose clamp 4 is a conventional "pinch type" clamp made of a spring steel and having a pair of ears 6, expandable to an open configuration. A removable, expansion element 5 holds ears 6 together so that hose clamp 4 is in the expanded, open configuration. Expansion element 5 may be removed during final assembly of hose 2 onto the stem component, thus allowing hose clamp 4 to be in the contracted, closed configuration.

Figure 2:
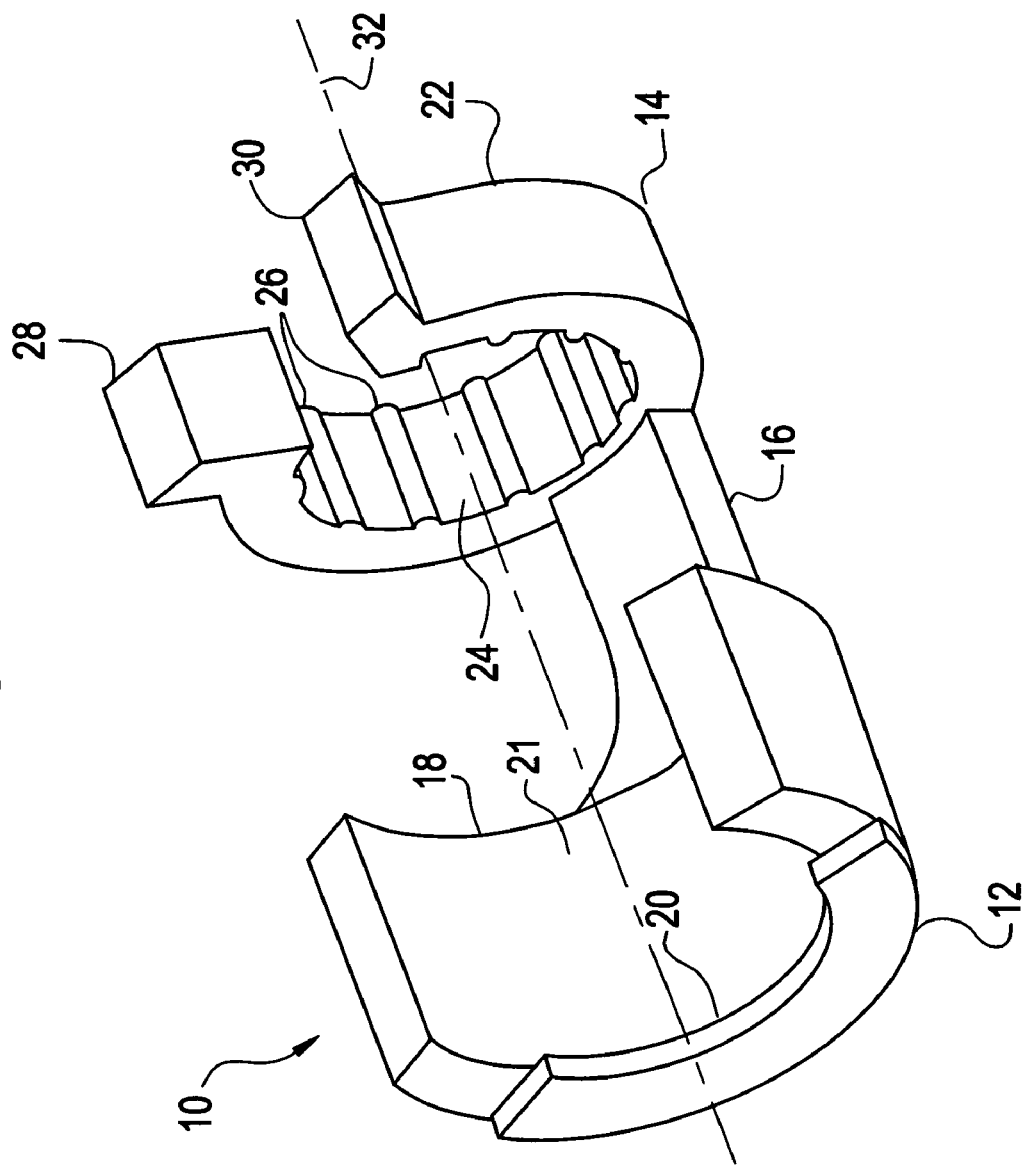
FIG. 2 is a perspective view of a first embodiment of the retaining device.

Retaining device 10 is made of a rigid and spring-like material such as any one of numerous, commercially available polymers and metals. Retaining device 10 may be injection molded, for example, from either a nylon or a polypropylene polymer, as shown in FIG. 2, or may be formed conventionally from spring steel, flat stock. Retaining device 10 removably attaches to hose 2 and hose clamp 4, and secures hose clamp 4 onto hose 2 while hose clamp 4 is in the expanded, open configuration. A manufacturer may preassemble hose/clamp assembly 70 with hose clamp 4 in the expanded, open configuration, and ship hose/clamp assembly 70 to another manufacturer for assembly to the stem component of the fluid-carrying system. Since no adhesives are used in hose/clamp assembly 70, exposure to high temperature, such as in a truck in hot weather during a cross country trip, will not affect the ability of retaining device 10 to secure hose clamp 4 onto hose 2. Additionally, retaining device 10 may be removed from hose 2 and hose clamp 4 after final assembly of hose/clamp assembly 70, when hose clamp 4 is converted to a contracted, closed configuration, onto the stem component, to facilitate later servicing of the fluid-carrying system.

FIG. 2 is a perspective view of retaining device 10, which comprises an arm 16 having a first end 12 attached to a clamp retainer 18, and a second end 14 attached to a hose clip 22. Arm 16 longitudinally spaces apart clamp retainer 18 and hose clip 22. Hose clip 22 does not grip onto a portion of hose 2 that normally surrounds the stem of the fluid carrying device so as not to increase the force required to assemble hose 2 onto the stem, which may have a barbed end. Arm 16 may be at least approximately one centimeter long, although arm 16 may be longer or shorter, depending on the particularly fluid-carrying system design/application. Additionally, longitudinally spacing apart hose clip 22 from claim retainer 18 facilitates removal of retaining device 10 from hose 2 by providing a space for insertion of a flat-bladed instrument such as a screw driver. Clamp retainer 18 retains hose clamp 4 and has a semi-circular shape about a longitudinal axis 32 with a radius approximately equal to the outside radius of hose clamp 4 (approximately 24 millimeters as shown for the first embodiment in FIG. 2) while in the expanded, open configuration. Clamp retainer 18 includes an arcuate, inner surface 21 that wraps around slightly more than half the outer circumference of hose clamp 4 to form a tight snap fit during assembly. Clamp retainer 18 has a retaining lip 20 to locate radially clamp retainer 18 on hose 2. Hose clip 22 has a semi-circular shape about longitudinal axis 32 with a radius approximately equal to the outside radius of hose 2. Hose clip 22 has an arcuate inner surface 24 that wraps around substantially more than half the outer circumference of hose 2 to form a tight snap fit during assembly. Clamp retainer 18 and hose clip 22 are oriented with their openings approximately in the same direction with respect to longitudinal axis 32 for easy assembly to and removal from hose 2 and hose clamp 4. Arm 16 spaces apart hose clip 22 from clamp retainer 18 so that the radial gripping force of hose clip 22 onto hose 2 does not contribute to the force required to assemble hose 2 onto the stem component.

Retaining device 10, as illustrated in FIG. 2, also includes a plurality of longitudinal ribs 26, also referred to as raised features. Longitudinal ribs 26 are radially spaced apart and protrude from arcuate inner surface 24 of hose clip 22 to provide additional grip on hose 2 and to help prevent retaining device 10 from rotating on hose 2, thus helping to hold clamp 4 in a predetermined orientation on hose 2.

FIG. 3, FIG. 4, FIG. 5, and FIG. 6 are views of a second embodiment of retaining device 10, which is very similar to the first embodiment, but with a variation of rotational element 26. As may be most easily viewed in FIG. 6, the second embodiment of retaining device 10 includes a first elongated tooth 40 and a second elongated tooth 42, which protrude further from arcuate inner surface 24 of hose clip 22 than longitudinal ribs 26. Hose clip 22 also includes a first lead-in tab 28 and a second lead-in tab 30 to facilitate the snap on assembly of hose clip 22 onto hose 2.

First elongated tooth 40 and second elongated tooth 42 provide two, concentrated lines of contact on hose 2 and are located in a circumferentially offset position on arcuate inner surface 24 to provide an additional, dynamic gripping force to resist rotation of hose clip 22 on hose 2 about longitudinal axis 32. First elongated tooth 40 is positioned near a first lead in tab 28, and second elongated tooth 42 is positioned near a second lead in tab 30, and are positioned above a horizontal axis 44 and offset (not directly opposite each other) with respect to the longitudinal axis. This positioning, combined with the flexural characteristics of hose clip 22, allows first elongated tooth 40 to "dig into" hose 2 when a torque in the clockwise direction about the longitudinal axis is applied to hose clip. Conversely, second elongated tooth 42 "digs into" hose 2 when a counter clockwise torque is applied.

The second embodiment of retaining device 10 also includes a pair of clamp locators 34 protruding from arcuate inner surface 21 of clamp retainer 18, shown in FIG. 3 and FIG. 4. Clamp locators 34 snap into recesses of hose clamp 4 to help locate and retain hose clamp 4 in clamp retainer 18.

FIG. 7, FIG. 8, FIG. 9, and FIG. 10 show views of a third embodiment of retaining device 10, which is similar to the second embodiment, but includes a variation of raised feature 26. In the third embodiment, raised feature 26 comprises a first springable contact 50, a second springable contact 52, and a third springable contact 54, protruding from arcuate inner surface 24 of hose clip 22, and radially spaced apart about longitudinal axis 32. Each of first, second, and third springable contacts 50, 52, and 54, includes a pair of contact fingers 58 cantilevered from a contact base 60 attached to arcuate inner surface 24. Each of contact fingers 58 has a contact tip 56 that contacts hose 2 with an approximately constant force to resist rotation of hose clip 22 about hose 2. The magnitude of the contact force of each contact tip 56 onto hose 2 depends on the deflection and bending strength of each of fingers 58.

While the present invention has been illustrated by a description of several expressions, embodiments, methods, and examples, etc. thereof, it is not the intention of the applicants to restrict or limit the spirit and scope of the appended claims to such detail. Numerous other variations, changes, and substitutions will occur to those skilled in the art without departing from the scope of the invention. It will be understood that the foregoing description is provided by way of example, and that other modifications may occur to those skilled in the art without departing from the scope and spirit of the appended Claims.

What is claimed is:

1. A hose/clamp assembly comprising:
   a hose;
   a hose clamp placed around the hose, the hose clamp being openable and closable; and
   a retaining device having an arm, a clamp retainer attached to a first end of the arm, and a hose clip attached to a second end of the arm;
   wherein the clamp retainer is removably attached to the hose clamp, and the hose clip is removably attached to the hose to secure the hose clamp to the hose; and
   wherein the clamp retainer and the hose clip each have a semi-circular shape defining an opening, wherein the opening of the clamp retainer forms a tight snap fit on the hose clamp when the hose clamp is in an expanded, open configuration, and wherein the opening of the hose clip forms a tight snap fit on the hose at a location spaced apart from the hose clamp.

2. The hose/clamp assembly of claim 1, wherein the clamp retainer is removably attached to the hose clamp when the hose clamp is in an expanded, open configuration.

3. The hose/clamp assembly of claim 1, wherein the arm is sized so as to provide a longitudinal spacing between the clamp retainer and the hose clip of at least approximately one centimeter.

4. The hose/clamp assembly of claim 1, wherein the clamp retainer further comprises a clamp locator protruding from an arcuate inner surface of the clamp retainer to help locate and retain the hose clamp in the clamp retainer.

5. The hose/clamp assembly of claim 1, wherein the retaining device further comprises at least one raised feature disposed on an arcuate inner surface of the hose clip to engage the outer surface of the hose to help to prevent rotation of the retaining device about the hose.

6. The hose/clamp assembly of claim 5, wherein the raised feature comprises a plurality of longitudinal ribs spaced apart on the arcuate inner surface of the hose clip.

7. The hose/clamp assembly of claim 6, wherein the raised feature further comprises a first and a second elongated tooth protruding from the arcuate inner surface of the hose clip, and located in a circumferentially offset position to provide a dynamic gripping force.

8. The hose/clamp assembly of claim 5, wherein the raised feature comprises a first and a second elongated tooth protruding from the arcuate inner surface of the hose clip, and located in a circumferentially offset position to provide a dynamic gripping force.

9. The hose/clamp assembly of claim 5, wherein the raised feature comprises at least one springable contact protruding from the arcuate inner surface of the hose clip, and the springable contact exerts an approximately constant force on the hose.

10. The hose/clamp assembly of claim 9, wherein the springable contact includes a pair of contact fingers cantilevered from a contact base that is attached to the arcuate inner surface.

11. The hose/clamp assembly of claim 1, wherein the retaining device is made of a polymer.

12. The hose/clamp assembly of claim 11, wherein the retaining device is made of a nylon polymer.

13. The hose/clamp assembly of claim 1, wherein the retaining device is made of a metal.

14. The hose/clamp assembly of claim 1, wherein the clamp retainer further comprises a retaining lip extending radially inwardly beyond an arcuate inner surface of the clamp retainer to locate radially the clamp retainer on the hose.

15. The hose/clamp assembly of claim 1, wherein the hose clip is spaced apart from the clamp retainer to permit the insertion of a removal tool to remove the retaining device from the hose and hose clamp.

16. The hose/clamp assembly of claim 1, wherein the hose clip is spaced apart from the clamp retainer to place the hose clip onto the hose at a location removed from the portion of the hose having the hose clamp that is to be assembled onto a stem component of a fluid-carrying system.

17. A retaining device for holding a hose clamp on a hose, the retaining device comprising an arm, a clamp retainer attached to a first end of the arm, and a hose clip attached to a second end of the arm, wherein the clamp retainer is capable of being removably attached to a hose clamp and the hose clip is capable of being removably attached to a hose to secure the hose clamp to the hose; wherein the clamp retainer and the hose clip each have a semi-circular shape defining an opening, wherein the opening of the clamp retainer is capable of forming a tight snap-fit on the hose clamp when the hose clamp is in an expanded, open configuration, and wherein the opening of the hose clip is capable of forming a tight snap-fit on the hose at a location spaced apart from the hose clamp;
 wherein the retaining device further comprises at least one raised feature disposed on an arcuate inner surface of the hose clip to engage the outer surface of the hose to help to prevent rotation of the retaining device about the hose; and
 wherein the raised feature comprises a first and a second elongated tooth protruding from the arcuate inner surface of the hose clip, and located in a circumferentially offset position to provide a dynamic gripping force.

18. A retaining device for holding a hose clamp on a hose, the retaining device comprising an arm, a clamp retainer attached to a first end of the arm, and a hose clip attached to a second end of the arm, wherein the clamp retainer is capable of being removably attached to a hose clamp and the hose clip is capable of being removably attached to a hose to secure the hose clamp to the hose: wherein the clamp retainer and the hose clip each have a semi-circular shape defining an opening, wherein the opening of the clamp retainer is capable of forming a tight snap-fit on the hose clamp when the hose clamp is in an expanded, open configuration, and wherein the opening of the hose clip is capable of forming a tight snap-fit on the hose at a location spaced apart from the hose clamp;
 wherein the retaining device further comprises at least one raised feature disposed on an arcuate inner surface of the hose clip to engage the outer surface of the hose to help to prevent rotation of the retaining device about the hose; and
 wherein the raised feature comprises at least one springable contact protruding from the arcuate inner surface of the hose clip, and the springable contact exerts an approximately constant force on the hose.

19. A method for installation of a hose clamp of a hose/clamp assembly comprising:
 (a) placing a hose/clamp assembly onto a stem component of a fluid-carrying system, the hose clamp assembly comprising:
  a hose;
  a hose clamp placed around the hose, the hose clamp being openable and closable; and
  a retaining device having an arm, a clamp retainer attached to a first end of the arm, and a hose clip attached to a second end of the arm;
  wherein the clamp retainer is removably attached to the hose clamp, and the hose clip is removably attached to the hose to secure the hose clamp to the hose; and
  wherein the clamp retainer and the hose clip each have a semi-circular shape defining an opening, wherein the opening of the clamp retainer forms a tight snap fit on the hose clamp when the hose clamp is in an expanded, open configuration, and wherein the opening of the hose clip forms a tight snap fit on the hose at a location spaced apart from the hose clamp;
 (b) converting the hose clamp from its open configuration to its closed configuration; and
 (c) removing the retaining device from the hose clamp and hose.

20. The method of claim 19, wherein removing the retaining device includes inserting a removal tool between the arm and the hose in the space between the hose clip and the clamp retainer.

* * * * *